Sept. 25, 1934.  J. L. L. HALL  1,974,648
DRIVER'S SIGNALING ARM ILLUMINATING MEANS Filed Jan. 23, 1930

INVENTOR.
JOHN L.L. HALL
BY
A.B.Bowman
ATTORNEY

Patented Sept. 25, 1934

1,974,648

UNITED STATES PATENT OFFICE 1,974,648

DRIVER'S SIGNALING ARM ILLUMINATING MEANS

John L. L. Hall, San Diego, Calif.

Application January 23, 1930, Serial No. 422,697

2 Claims. (Cl. 177—329)

My invention relates to driver's signaling arm illuminating means, and the objects of my invention are:

First, to provide a device of this class which illuminates the driver's arm while making a signal so that the arm is readily visible;

Second, to provide a device of this class which illuminates the driver's arm with equal effectiveness whether in the position for a right-hand turn, a left-hand turn, or for a stop signal;

Third, to provide a device of this class having a switch means therefor, which is naturally engageable by the driver's arm when he extends it from the car in order to make a signal, thus lighting the signal only when needed;

Fourth, to provide a device of this class which may be mounted on practically any type of car without drilling holes or otherwise marring the finish;

Fifth, to provide a device of this class which, although mounted on the rear vertical frame of an automobile door, does not in any way interfere with the door or with the raising and lowering of the window therein;

Sixth, to provide a device of this class which reduces the dangers of night driving; and Seventh, to provide on a whole a novelly constructed signal of this class which is particularly simple of construction proportional to its functions, durable, efficient in its action, and which will not readily deteriorate or get out of order.

Figure 1:
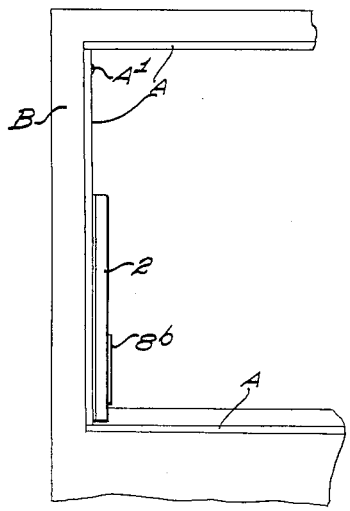
Figure 2:
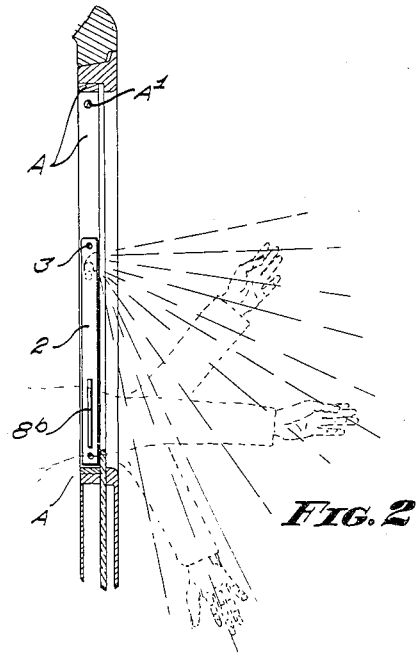
Figure 3:
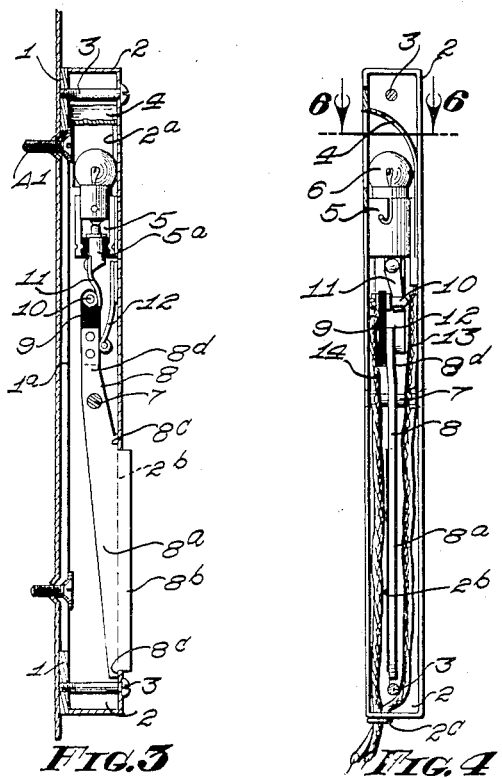
Figures 4, 5:
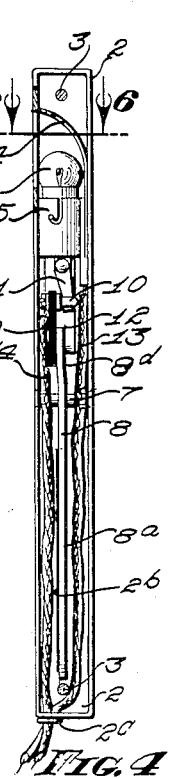
Figure 6:
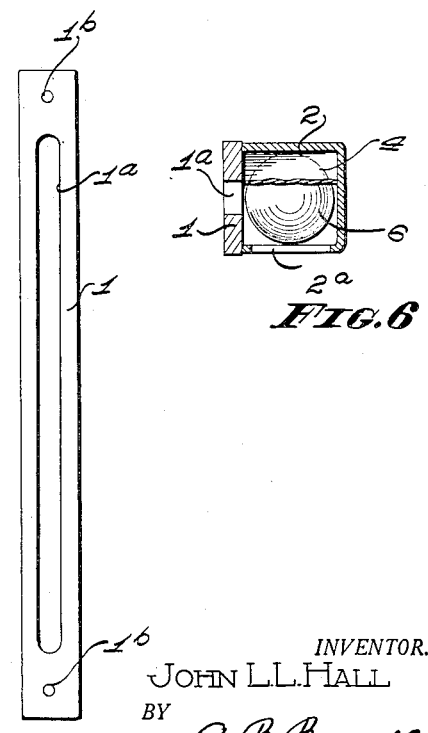

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon, which form a part of this application, in which:

Figure 1 is a fragmentary elevational view of a vehicle door with my device shown in position thereon; Fig. 2 is a fragmentary sectional view of the door and adjacent portions of the body with my device shown in connection therewith, and illustrating by dotted lines the several positions of the driver's arm when signaling, thereto; Fig. 3 is a longitudinal sectional view of my device showing adjacent portions of the door frame in section, and with parts and portions in elevation to facilitate the illustration; Fig. 4 is an elevational view of the casing and the mechanism therein removed from the base plate, taken at right angles to Fig. 3; Fig. 5 is an elevational view of the base plate; and Fig. 6 is an enlarged transverse sectional view through 6—6 of Fig. 4.

Similar characters of reference refer to similar parts and portions throughout the several views of the drawing.

Base member 1, casing 2, screws 3, reflector 4, light socket 5, light globe 6, journal pin 7, contact lever 8, insulating member 9, contact pin 10, contact spring 11, leaf spring 12, and wires 13 and 14 constitute the principal parts and portions of my novel device.

Practically all makes of cars are provided with molding strips A which border each side window of the car inside of the windowpane. These strips cover the margins of the inside finish of the car. The rear vertical molding strip A is secured to the rear frame B of the car by two or more screws A1, usually three screws.

My device is mounted upon this molding strip. A rectangular flat, elongated base member 1 is provided, having a longitudinally extending slot 1a, which terminates just short of the ends of the base member, as shown in Fig. 5. The slot 1a is longer than the distance between the adjacent screws A1 of the rear vertical molding A. The two lower screws of the rear vertical molding strip are removed, then inserted through the slot 1a and re-secured, thus mounting the base member upon the rear vertical molding A, as shown in Figs. 1 and 3.

Adjacent the ends of the base member 1, said member is provided with two small threaded openings 1b. A casing is adapted to fit over the base member 1. The casing is in the form of an elongated rectangular box open only on the one of its sides. The casing has approximately the same dimensions as the base member 1 so that its side walls fit substantially flush with the edges of the base member, as shown in Figs. 3 and 6.

The casing is held with its open side against the base member 1 by screws 3 which screw into the holes 1b. The casing is provided with a rectangular aperture 2a near its upper end at the side thereof facing the outside of the car.

A reflector 4 in the form of a curved strip of material is secured at its one end to the upper margin of the aperture 2a. The reflector curves downwardly from this end and into the casing towards the opposite wall, becoming tangential to said opposite wall at a point approximately opposite the lower margin of the aperture 2a. This is shown best in Fig. 4.

Secured within the casing 2, just below the aperture 2a is a light socket 5 adapted to support a conventional automobile light globe 6 of small size. The light globe 6 extends upwardly from its socket 5 and is opposite the aperture 2a, as shown best in Fig. 4. Below the socket 5, is a journal pin 7, which is supported in the side walls of the casing 2 in transverse, parallel disposed relation to the base member 1.

Pivotally mounted upon this pin is a lever member 8, which is vertically disposed so as to extend longitudinally with the casing. The lower arm 8a of the lever is relatively long, and is provided with a long engaging ridge which projects through a slot 2b formed in the lower portion of the casing 2 at the side thereof opposite the base member 1. The engaging ridge 8b projects a slight distance outwardly from the casing 2, as shown in Figs. 1 and 3. The engaging ridge 8b is of sufficient length to be readily engaged by the portion of the driver's arm adjacent the shoulder when the driver swings his hand outside the window for making a signal. Shoulders 8c at the ends of the engaging ridge 8b limit the outward movement of the lever.

The upwardly extending arm 8d of the lever has secured thereto an insulating member 9, which forms an upward continuation of the arm, and is provided with a transversely extending contact pin 10 near its extended end. The switch socket 5 is provided with a contact portion 5a to which is secured a contact spring 11 which extends downwardly from the light socket into engaging relation with the contact pin 10.

A leaf spring 12 is secured by its one end to the casing 2 so that the extended end of the spring resiliently engages the upper arm 8d of the lever so as to hold the contact pin 10 clear of the contact spring 11 and hold the engaging ridge 8b of the lever in its protruding position shown in Figs. 1 and 3.

A wire conductor 13 is suitably secured to the socket 5 and extends downwardly within the casing along the one side of the lever 8, and out through a suitable opening 2c provided in the lower end of the casing. A second wire 14 is secured to the contact pin 10 and likewise extends down along the side of the lever 8 and out through the same opening 2c. These wires lead along the lower molding A of the door, and may be concealed thereby. These wires are suitably secured to a source of electric energy on the car, such as a battery.

The reflector 4 is preferably made flat transversely so as to project a fan-like beam of light, as indicated in Fig. 2, which illuminates the rear side of the arm and hand regardless of the signal being given, as shown by the several dotted positions in Fig. 2.

The driver in putting out his hand for signaling engages the portion 8b with the back of his arm, thereby completing the circuit through the light 6 and illuminating his hand.

If desired, the casing 2 may be formed integrally with the rear vertical molding A by tamping out the molding a suitable distance to receive the socket 5 and light globe 6 and lever 8, thereby eliminating the base member 1.

It is obvious from the construction as illustrated in the drawing, and described in the foregoing specification that there is provided a device as aimed at and set forth in the objects of the invention, and though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a device of the class described a vehicle, a window adjacent the driver of said vehicle, an elongated casing, means for vertically mounting the casing along the back side of said window opening, a light means in the front part of said casing, an opening in the upper part of said casing and positioned so that light from the light means shines outwardly through the window, means for directing the light downwardly as well as outwardly through the window, a switch for the light means located within the casing and an operating portion of said switch projecting from the lower portion of said casing and on the forward side of the same so as to project into the space of said window opening.

2. In an article of manufacture, an elongated casing having front, rear and side walls, means on the rear wall for attaching said casing to a support, a light means in said casing near one end, one of the side walls of said casing being provided with an opening so positioned that the light from the light means shines outwardly from the casing, means for directing the light generally towards the other end of the casing as well as outwardly therefrom, a switch for the light means located within the casing and having an operating portion projecting from the front side of the casing near the end opposite the lamp.

JOHN L. L. HALL.